(12) United States Patent
Kenney et al.

(10) Patent No.: US 10,821,518 B2
(45) Date of Patent: Nov. 3, 2020

(54) ADDITIVE MANUFACTURING METHOD AND APPARATUS

(71) Applicant: General Electric Company, Schenectady, NY (US)

(72) Inventors: Patrick Michael Kenney, Cincinnati, OH (US); Dustin Eugene Lindley, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 52 days.

(21) Appl. No.: 16/169,290

(22) Filed: Oct. 24, 2018

(65) Prior Publication Data

US 2019/0054533 A1 Feb. 21, 2019

Related U.S. Application Data

(63) Continuation of application No. 14/440,154, filed as application No. PCT/US2013/067975 on Nov. 1, 2013, now Pat. No. 10,124,408.

(Continued)

(51) Int. Cl.
*B22F 3/105* (2006.01)
*B33Y 50/00* (2015.01)
(Continued)

(52) U.S. Cl.
CPC .......... *B22F 3/1055* (2013.01); *B29C 64/153* (2017.08); *B33Y 10/00* (2014.12);
(Continued)

(58) Field of Classification Search
None
See application file for complete search history.

(56) References Cited

U.S. PATENT DOCUMENTS 4,116,723 A 9/1978 Gell et al.
4,863,538 A 9/1989 Deckard
(Continued)

FOREIGN PATENT DOCUMENTS

CN 102380711 A 3/2012
EP 2246145 A1 11/2010
(Continued)

OTHER PUBLICATIONS

International Search Report and Written Opinion issued in connection with corresponding patent application PCT/US2013/067975 dated Feb. 24, 2014.

(Continued)

*Primary Examiner* — Colin W. Slifka
(74) *Attorney, Agent, or Firm* — Dority & Manning, P.A.

(57) ABSTRACT

A method and apparatus for fabricating an object. The method and apparatus entail applying a pulsed laser energy to a first quantity of a powder material on a substrate so as to fuse particles of the powder material into a first layer on the substrate, and then forming at least one additional layer on the first layer by applying a pulsed laser energy to at least a second quantity of the powder material on the first layer so as to fuse particles of the powder material into the at least one additional layer on the first layer. The pulsed laser energy is applied in a controlled manner such that solidification dynamics of the first and second quantities of the powder material are altered to promote at least one microstructural characteristic of the first and additional layer.

6 Claims, 2 Drawing Sheets

Related U.S. Application Data (60) Provisional application No. 61/721,341, filed on Nov. 1, 2012.

(51) Int. Cl.
*C22C 1/04* (2006.01)
*B29C 64/153* (2017.01)
*B33Y 10/00* (2015.01)
*B33Y 70/00* (2020.01)
*B33Y 30/00* (2015.01)
*B33Y 50/02* (2015.01)

(52) U.S. Cl.
CPC ............ *B33Y 50/00* (2014.12); *C22C 1/0416* (2013.01); *B22F 2003/1057* (2013.01); *B33Y 30/00* (2014.12); *B33Y 50/02* (2014.12); *B33Y 70/00* (2014.12); *Y02P 10/25* (2015.11)

(56) References Cited

U.S. PATENT DOCUMENTS

| 4,944,817 | A | 7/1990 | Bourell et al. |
| 5,017,753 | A | 5/1991 | Deckard |
| 5,076,869 | A | 12/1991 | Bourell et al. |
| 5,399,313 | A | 3/1995 | Ross et al. |
| 6,036,777 | A | 3/2000 | Sachs |
| 6,475,642 | B1 | 11/2002 | Zhao et al. |
| 2009/0277540 | A1 | 11/2009 | Langlet |
| 2011/0165339 | A1 | 7/2011 | Skoglund et al. |

FOREIGN PATENT DOCUMENTS

| JP | H10-286684 A | 10/1998 |
| JP | 2007-106108 A | 4/2007 |
| JP | 2011-021218 A | 2/2011 |
| WO | 2010125371 A1 | 11/2010 |
| WO | 2011050790 A2 | 5/2011 |

OTHER PUBLICATIONS

Mumtaz et. al.: "High Density selective laser melting of Waspaloy<(>R)", Journal of Materials Processing Technology. Elsevier, NL, vol. 195, No. 1-3, Nov. 30, 2007 (Nov. 30, 2007), pp. 77-87, XP022370845, ISSN: 0924-0136, DOI: 10.1016/J. JMATPROTEC. 2007.04.117 p. 78, right-hand column, p. 79, right-hand column, pp. 83, 84, 86, p. 87.

Buchbinder D et. al.:"High Power Selective Laser Melting (HP SLM) of Aluminum Parts", Physics Procedia, vol. 12, Jan. 1, 2011 (Jan. 1, 2011), pp. 271-278, XP028379969, ISSN: 1875-3892, DOI: 10.1016/J.PHPRO.2011.03.035 [retrieved on Apr. 15, 2011] p. 2.

Savalani M M et. al: "Selective Laser Melting of Aluminum and its alloys", NZ Rapid Product Development Conference 2011; The Auckland University of Technology, Auckland, New Zealand; Feb. 7-8, 2011, Feb. 7, 2011 (Feb. 7, 2011), pp. 1-5, p. 273-p. 277 figure 10.

Unofficial English translation of Chinese Office Action issued in connection with corresponding CN Application No. 201380056864.9 dated Oct. 20, 2015.

Machine Translation and Notification of Reasons for Refusal issued in connection with corresponsing JP Application No. 2015-539963 dated Dec. 5, 2017.

European Search Report Corresponding to Application No. 19204843 dated Mar. 6, 2020.

Yang et al., "Laser solid forming Zr-based bulk metallic glass", Intermetallics, Elsevier Science Publishers B.V., vol. 22, Oct. 5, 2011, pp. 110-115 (Abstract Only).

ADDITIVE MANUFACTURING METHOD AND APPARATUS

CROSS REFERENCE TO RELATED APPLICATIONS

This application is a continuation of U.S. application Ser. No. 14/440,154, filed Nov. 1, 2013, which is a national stage application under 35 U.S.C. § 371(c) of PCT application serial number PCT/US2013/067975, filed on Nov. 1, 2013, which claims priority to U.S. Provisional Application No. 61/721,341, filed Nov. 1, 2012, the contents of which are incorporated herein by reference.

BACKGROUND OF THE INVENTION

The present invention generally relates to methods and apparatuses adapted to perform additive manufacturing (AM) processes, and specifically, AM processes that employ energy beam to selectively fuse a powder material to produce an object. More particularly, the invention relates to methods and systems that use a pulsed, directed energy beam to achieve predetermined densification and microstructural evolution in AM processes.

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include patterns for investment casting, metal molds for injection molding and die casting, and molds and cores for sand casting. Fabrication of prototype objects to enhance communication and testing of concepts during the design cycle are other common usages of AM processes.

Laser sintering is a common industry term used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Laser sintering/melting techniques often entail projecting a laser beam onto a controlled amount of powder (usually a metal) material on a substrate, so as to form a layer of fused particles or molten material thereon. By moving the laser beam relative to the substrate along a predetermined path, often referred to as a scan pattern, the layer can be defined in two dimensions on the substrate, the width of the layer being determined by the diameter of the laser beam where it strikes the powder material. Scan patterns often comprise parallel scan lines, also referred to as scan vectors or hatch lines, and the distance between two adjacent scan lines is often referred to as hatch spacing, which is usually less than the diameter of the laser beam so as to achieve sufficient overlap to ensure complete sintering or melting of the powder material. Repeating the movement of the laser along all or part of a scan pattern enables further layers of material to be deposited and then sintered or melted, thereby fabricating a three-dimensional object.

In the past, laser sintering and melting techniques have been performed using continuous wave (CW) lasers, typically Nd:YAG lasers operating at 1064 nm. This can achieve high material deposition rates particularly suited for repair applications or where a subsequent machining operation is acceptable in order to achieve the finished object. The method does not, however, lend itself to the production of near-net-shape objects to close tolerances and with a high quality surface finish. Another obstacle that these processes face is the presence of microstructural defects (e.g., voids, impurities, or inclusions) in the final product. Such defects can lead to catastrophic failure.

In view of the above, it can be appreciated that there are certain problems, shortcomings or disadvantages associated with laser sintering and melting techniques, and that it would be desirable if improved methods and equipment were available and capable of producing near-net-shape objects to close tolerances and/or to have high quality surface finishes, and/or capable reducing or eliminating cracks, inclusions, and pores between deposit layers in a finished object.

BRIEF DESCRIPTION OF THE INVENTION

The present invention provides a method and apparatus suitable for use in AM (additive manufacturing) techniques, in which an energy beam is used to selectively sinter (fuse) or melt a powder material to produce a 3D object.

According to a first aspect of the invention, a method of fabricating an object entails applying a pulsed laser energy to a first quantity of a powder material on a substrate so as to fuse particles of the power material into a first layer on the substrate, and then forming at least one additional layer on the first layer by applying a pulsed laser energy to at least a second quantity of the powder material on the first layer so as to fuse particles of the powder material into the at least one additional layer on the first layer. The pulsed laser energy is applied in a controlled manner such that solidification dynamics of the first and second quantities of the powder material are altered to promote at least one microstructural characteristic of the object comprising the first and additional layer.

Other aspects of the invention include apparatuses adapted to perform a method comprising the steps described above, and articles fabricated by a method comprising the steps described above.

A technical effect of the invention is the ability to appropriately modulate a laser beam pulse to accurately and precisely control the amount of heat applied to a powder material, particularly for the purpose of achieving much finer control of the characteristics of the final object produced thereby, for example, the reduction if not absence of microstructural defects, for example, voids, impurities, inclusions, and particularly microcracks and porosity. Without wishing to be limited to any particular theory, it is believed that the effect of pulse laser energy control on the material's solidification dynamics influences the temporal and spatial thermal gradients induced into the material by the energy deposition, the resulting transient, localized, temperature-dependent material properties commensurate with the thermal gradient, and the resulting material's physical response or microstructural characteristics.

These and other aspects are explained more fully with reference to embodiments discussed below. It should be understood that in general the features of one embodiment also may be used in combination with features of another embodiment, and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION OF THE INVENTION

The following definitions apply to the present invention.

As used in this context, "mechanical performance" is meant to include toughness (e.g., fracture toughness), ductility, creep resistance, and intermediate temperature strength.

The term "superalloy" is usually intended to embrace complex cobalt- or nickel-based alloys, which include one or more other elements, for example, rhenium, aluminum, tungsten, molybdenum, titanium, and/or iron. Such materials are described in various references, including U.S. Pat. Nos. 6,475,642; 5,399,313; and 4,116,723, which are incorporated herein by reference.

The term "AM processes" (also, "additive manufacturing" processes) as used herein refers to any process which results in a useful, three-dimensional object and includes a step of sequentially forming the shape of the object one layer at a time. AM processes include three-dimensional printing (3DP) processes, laser-net-shape manufacturing, direct metal laser sintering (DMLS), direct metal laser melting (DMLM), plasma transferred arc, freeform fabrication, etc. A particular type of AM process uses an energy beam, for example, an electron beam or electromagnetic radiation such as a laser beam, to sinter or melt a powder material. AM processes often employ relatively expensive metal powder materials or wire as a raw material. An example of a 3DP process may be found in U.S. Pat. No. 6,036,777 to Sachs, issued Mar. 14, 2000.

The present invention relates generally to AM processes as a rapid way to manufacture an object (article, component, part, product, etc.) where a multiplicity of thin unit layers are sequentially formed to produce the object. More specifically, layers of a powder material are laid down and irradiated with an energy beam (e.g., laser beam) so that particles of the powder material within each layer are sequentially sintered (fused) or melted to solidify the layer. According to an aspect of the invention, a pulsed-laser additive manufacturing (AM) apparatus is employed to generate a pulsed laser beam and perform a laser melting method capable of producing a three-dimensional object by fully melting particles within successive layers of a powder material to form a solid homogeneous mass.

Detailed descriptions of laser sintering/melting technology may be found in U.S. Pat. Nos. 4,863,538, 5,017,753, 5,076,869, and 4,944,817. With this type of manufacturing process, a laser beam is used to selectively fuse a powder material by scanning cross-sections of the material in a bed. These cross-sections are scanned based on a three-dimensional description of the desired object. This description may be obtained from various sources such as, for example, a computer aided design (CAD) file, scan data, or some other source.

According to certain aspects of the invention, the powder material can be a metallic material, nonlimiting examples of which include aluminum and its alloys, titanium and its alloys, nickel and its alloys, stainless steels, cobalt-chrome alloys, tantalum, and niobium. Methods of producing a three-dimensional structure may include depositing a first layer of one or more of the aforementioned powder materials on a substrate. At least one additional layer of powder material is deposited and then the laser scanning steps for each successive layer are repeated until a desired object is obtained. In fabricating a three-dimensional structure, the powder material can be either applied to a solid base or not. The article is formed in layer-wise fashion until completion. In the present invention, there is no particular limitation on the particle shape of the powder material used in an embodiment of the present invention. The average grain size of the powder material is, in an embodiment, about 10 to 100 µm.

In certain embodiments, the present invention provides for an aluminum product that has high dimensional accuracy and excellent microstructural characteristics, for example, characterized by the substantial absence of microstructural defects such as voids, impurities, inclusions, and particularly microcracks and porosity, without employing metal stamping, even though the product may be formed of a pure aluminum- and/or aluminum alloy-based powder material that is considered to be resistant to sintering. An aluminum alloy is defined herein as a metal alloy containing at least 50 mass % of aluminum.

In one embodiment, the AM process is carried out under an inert atmosphere. In another embodiment, the inert atmosphere is an atmosphere comprising a gas selected from the group consisting of helium, argon, hydrogen, oxygen, nitrogen, air, nitrous oxide, ammonia, carbon dioxide, and combinations thereof. In one embodiment, the inert atmosphere is an atmosphere comprising a gas selected from the group consisting of nitrogen ($N_2$), argon (Ar), helium (He) and mixtures thereof. In one embodiment, the inert atmosphere is substantially an argon gas atmosphere.

In another embodiment, the pulsed-laser AM apparatus comprises a build chamber within which an article can be fabricated, a movable build platform within the chamber and on which the article is fabricated, a powder material delivery system, and a laser delivery system. The powder material delivery system delivers a powder material to the build platform. In an optional embodiment, a heating system may be employed that is capable of heating the powder material and the platform with a heated gas. By conforming to the shape of the object, powder material is only needed for portions of the movable platform on which the process is to be performed.

Figure 1:
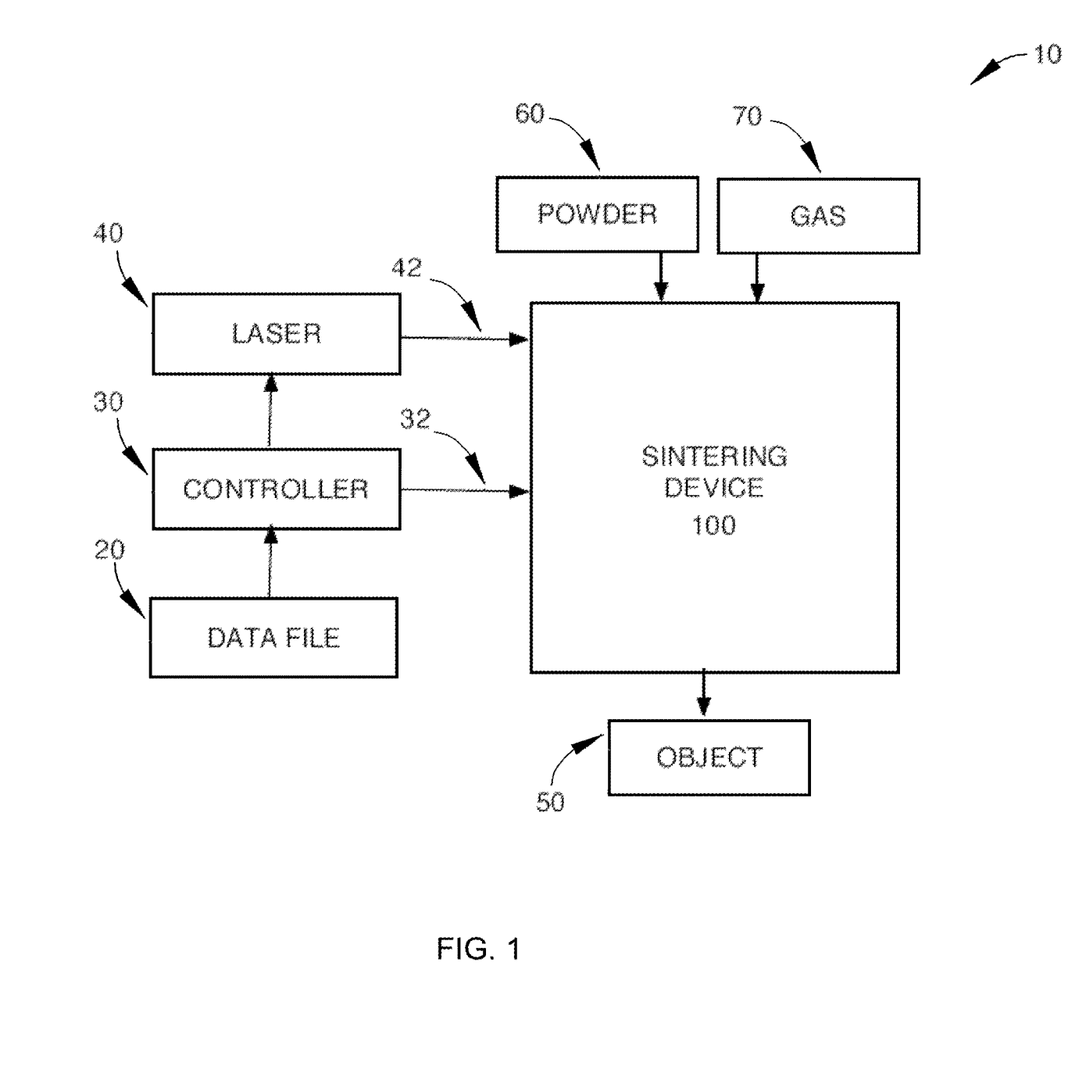
FIG. 1 depicts a diagram of an apparatus encompassing certain aspects of the present invention.

With reference now to FIG. 1, a diagram of a pulsed-laser AM apparatus 10 is depicted in accordance with one embodiment. In the particular example illustrated in FIG. 1, the apparatus 10 includes a pulsed-laser additive manufacturing (AM) device 100 there, in an embodiment, comprises a build chamber (not shown) within which an object 50 is to be fabricated and a movable build platform (not shown) within the build chamber and on which the object 50 is fabricated. The apparatus 10 further includes a pulsed-laser generating system 40 and a controller 30. In the illustrative example, a powder material 60 may be placed into the AM device 100 to create an object 50 using a pulsed laser beam 42 generated by the generating system 40. The object 50 may take various forms. The controller 30 may send control signals to the generating system 40 and control signals 32 to the AM device 100 to control the heating and, in some embodiments, melting of the powder material 60 to form the object 50. These control signals 32 may be generated using design data 20.

The pulsed laser beam 42 can be generated by pulsed excitation or by measures within the pulsed-laser generating system 40 (Q-switching or mode coupling). The pulsed laser beam 42 is not emitted continuously, in contrast with a continuous wave (CW) laser, but is emitted in a pulsed manner, i.e., in timely limited pulses.

In one embodiment, the generating system 40 is adapted to perform layer-by-layer and local fusing (melting or sintering) of the powder material 60. In one embodiment, the powder material 60 is an alloy sensitive to cracking in conventional laser sintering/melting processes, and the laser beam 42 is delivered in a controlled manner such that the solidification dynamics of the molten powder material 60 is altered to provide better microstructural characteristics of the resulting object 50. In one embodiment, the microstructural characteristics include one or more stress, strain and cracking states of the resolidified powder material 60. Without wishing to be limited to any particular theory, it is believed that the effect of pulse laser energy control on the material's solidification dynamics influences the temporal and spatial thermal gradients induced into the material by the energy deposition, the resulting transient, localized, temperature-dependent material properties commensurate with the thermal gradient, and the resulting material's physical response or microstructural characteristics.

In one embodiment, the pulsed-laser generating system 40 is a pulsed Nd:YAG laser. In another embodiment, the generating system 40 is a pulsed fiber (fibre) laser. The fiber laser is generally a laser in which the active gain medium is an optical fiber doped with rare-earth elements such as erbium, ytterbium, neodymium, dysprosium, praseodymium, and thulium. Fiber nonlinearities, such as stimulated Raman scattering or four-wave mixing can also provide gain and thus serve as gain media for a fiber laser. In another embodiment, the generating system 40 may be a Gaussian style sealed tube $CO_2$ pulsed laser. Thus, the generating system 40 may implement a $CO_2$ laser.

According to some aspects of the invention, the laser beam 42 is applied in a pulsed manner utilizing laser welding parameters determined by the laser peak power, duty cycle of the pulse train, scan velocity (hatch speed), and hatch spacing (offset between adjacent scanned powder materials) to produce an article that is free or substantially free of microstructural defects, particularly microcracks and porosity. In particular, the laser pulse and its associated parameters are controlled to achieve what is termed herein a global energy density calculated with the equation:

$$\text{Global Energy Density} = P_{avg}/vs$$

where v is the scan velocity, s is the hatch spacing, and $P_{avg}$ is the laser average power calculated by multiplying the laser peak power ($P_O$) by the duty cycle (D, nondimensional), the latter being calculated by multiplying the pulse width ($\tau$, duration in seconds) by the pulse frequency (f, rate in cycles per second).

The pulse frequency of the pulsed laser beam may be in a range of approximately 50 Hz to 50 KHz. In another embodiment, the pulse frequency is in the range of approximately 1 KHz to 50 KHz. In another embodiment, the pulse frequency is in the range of approximately 3 KHz to 50 KHz. In another embodiment, the pulse frequency is in the range of approximately 10 KHz to 50 KHz. In another embodiment, the pulse frequency is in the range of approximately 20 KHz to 50 KHz.

According to the present invention, the laser beam 42 can be modulated in a sinusoidal wave, rectangular wave, rectified sine wave, square wave, or any other waveform (e.g. sawtooth wave), which may be periodic or non-periodic or is repetitively shunted at a radio frequency. Such waves may have a ramp up, ramp down or both. In an embodiment, the degree of modulation can be optimized to meet the requirements for best performance of the solidification qualities.

Operator specified values can be computer fed into a waveform generator to specify appropriate time delay values and, in an embodiment, control the pulse energy of individual pulses that form into the burst pulse. Different profiles and repetition rates within the burst envelop with respect to the course or progress of the pulse peak intensity can therefore be arbitrarily defined and varied. For example, bursts of pulses can be generated where the pulse-energy envelope ramps up or ramps down monotonically or remains constant. Gaussian, Lorentzian, super-Gaussian, exponential rising, exponential falling and many other forms of pulse energy envelopes are anticipated by the invention. Combinations of short repetitive bursts, changes to the repetition rate, sinusoidal, and aperiodic distributions may be generated by the various embodiments described by the present invention. In certain embodiments, the modulation waveform is of high duty cycle ($D = P_{avg}/P_O = \tau f$) to deliver sufficient pump energy without the risk of overdriving the laser.

The peak power ($P_O$) of the pulsed laser beam 42 may be about 5 W to about 2000 W. In another embodiment, the peak power is about 40 to about 1000 W. In another embodiment, the peak power is about 100 W to about 500 W. In another embodiment, the peak power is provided in multiple points of incidence by splitting higher power beams and using multiple scan heads.

In one embodiment, the laser scan velocity is in the range of from about 100 mm/s to about 2000 mm/s. In another embodiment, the laser scan velocity is in the range of from about 200 mm/s to about 1000 mm/s. In another embodiment, the laser scan velocity is in the range of from about 200 mm/s to about 400 mm/s. In yet another embodiment, lower scan velocities may be used, for example, in a range about 80 to about 400 mm/s.

In one embodiment, the hatch spacing is from about 0.02 mm to about 0.2 mm. In another embodiment, the hatch spacing is from about 0.04 mm to about 0.1 mm. In another embodiment, the hatch spacing is from about 0.05 mm to about 0.07 mm. Based on the hatch spacing and typical ranges for laser beam diameters, a typical beam overlap (b) may be about −1200% to about 50%.

In one embodiment, the duty cycle is from about 0.1 to about 0.95. In another embodiment, the duty cycle is from about 0.2 to about 0.8. In another embodiment, the duty cycle is from about 0.3 to about 0.7. In embodiments in which the powder material 60 is aluminum or an aluminum alloy, a particularly suitable duty cycle is believed to be about 0.5 to about 0.7. In other embodiments, a particularly suitable duty cycle is believed to be about 0.4 to about 0.6.

The thicknesses of a first layer and successive layers of the powder material 60 that are sequentially fused with the pulsed laser beam 42 are, in an embodiment, about 5 μm to about 2000 μm. In one embodiment, the powder material layer thickness scales with the available laser power. In another embodiment, the powder material layer thickness is about 10 μm to 200 μm. In another embodiment, the powder material layer thickness is about 20 μm-50 μm.

In one embodiment, the AM device 100 is capable of heating the powder material 60 with a heated gas 70 prior to the powder material 60 being subjected to the pulsed laser beam 42. Additionally, the heated gas 70 may heat other objects within the AM device 100 in a manner that may help maintain temperatures of already processed layers of the powder material 60 closer to the temperature of layers being fused.

The illustration of the apparatus 10 in FIG. 1 is not meant to imply physical and/or architectural limitations to the manner in which different environments may be implemented. For example, in other embodiments, the pulsed-laser generating system 40 may be implemented as part of the pulsed-laser AM device 100 rather than as a separate unit. The different units are illustrated as functional components, which may be combined or further separated into additional blocks depending on the particular implementation. In yet another example, the controller 30 may be implemented within the pulsed-laser AM device 100.

At first, the form and the material buildup of the object 50 are determined as design data 20 in a computer. The design data 20 also may take various forms. For example, the design data 20 may be a computer aided design (CAD) file or scan data. The CAD file of the three-dimensional electronic representation is typically converted into another file format known in the industry as stereolithographic or standard triangle language ("STL") file format or STL format. The STL format file is then processed by a suitable slicing program to produce an electronic file that converts the three-dimensional electronic representation of the object 50 into an STL format file comprising the object 50 represented as two-dimensional slices. Suitable programs for making these various electronic files are well-known to persons skilled in the art.

The layer information generated from this process is inputted into the controller 30, which produces the signals 32 delivered to a computer (not shown) of the AM device 100 to control the build platform thereof. The control signals 32 may also be utilized to control the supply of the powder material 60 and control the pulsed-laser generating system 40. The computer can also be used in particular as a control computer of the AM device 100. In the further course of the production of the object 50, the layer-by-layer buildup of the object 50 may take place in accordance with a, additive manufacturing method as previously described.

In other embodiments, the volume of the build chamber of the AM device 100 is not required to be airtight. With this type of implementation, a positive pressure is, in an embodiment, maintained within the build chamber. The pressure may be maintained by a pressure and/or temperature regulator. In one embodiment, the temperature of the gas may be from around 100 degrees Celsius to around 400 degrees Celsius. In operation, gas may be introduced into the powder material delivery system and build chamber through a gas port. Depending on the particular implementation, the gas may be preheated prior to being introduced through the gas port. The heated gas is circulated and heats the powder material and build chamber. The heated gas also may heat the build platform. Heating the build platform may provide indirect heating of the powder material located on the build platform. The use of an inert gas to heat the powder material and the build platform is in contrast to currently used mechanisms in which quartz, rod heaters, or carbon fiber heating elements are employed to directly heat a build platform. The heating of the build platform and other system components may reduce the amount of laser energy needed to fuse the powder material 60. This type of capability is useful when higher temperature materials are used for the powder material 60.

After a layer of the powder material 60 has been processed as a result of being melted by the pulsed laser beam 42, at least a portion of the build platform may be moved, for example, lowered within the build chamber. Thereafter, additional powder material 60 may be delivered to deposit another layer of the powder material 60 onto the previous layer and the build surface of the build platform. The additional layer of the powder material 60 can then be processed using the laser beam 42 delivered by the generating system 40. Each time a layer of the powder material 60 is deposited, a recoater may be sued to smooth the powder layer such that the powder layer defines a substantially planar surface. With this type of movement of the build platform, less powder material 60 may be used. Specifically, less powder material 60 is deposited onto areas in which movable stages have not moved downwards or have moved downwards less than other portions.

The apparatus 10 may be constructed by modifying currently available laser sintering or melting systems. The different embodiments may use a currently available laser sintering or melting system modified to include the pulsed-laser generating system 40. Further, the apparatus 10 may be modified to include a suitable build platform and source of heated gas 70. Also, in other embodiments, a door may be included in a manner that allows for removing the part from the build chamber.

One of the greatest sources of difficulty in the production of parts using prior art laser sintering processes is the creation of residual stresses during the production of parts. As discussed below, a pulsed laser beam 42 is believed to be capable of reducing the magnitude of residual stresses, providing some additional geometric freedom and process robustness.

Materials that have constituents with varying melting points are more likely to have a wider brittle temperature range, which is the difference between the coherence temperature (below which the semi-molten metal begins to produce grains that interlock, thus providing the material with some tensile strength) and the nil-ductility temperature (below which semi-molten metal begins to gain ductility). An essential condition for cracking to occur is that the stress experienced by the material must be greater than its fracture strength. The stress here is caused by thermal shrinkage, and very low fracture strength occurs in this brittle temperature range. A pulsed laser beam 42 is believed to be capable of providing improved properties by limiting the length over which these stresses occur and by providing vibration in the molten area, which potentially could allow easier backfilling with molten material of any cracks that do develop.

There are a number of different material parameters that possess this physical phenomenon but generally materials that have high ductility, as measured by elongation, for example, are more likely to be improved with the present invention. Those with low ductility are more likely to benefit from a pulsed laser beam 42. There are exceptions, most notably aluminum materials described above, which generally have a fairly high room temperature ductility (>10% elongation in most cases), but are very susceptible to hot cracking, due both to its large brittle temperature range and high solidification shrinkage (for example, about 6.6% for aluminum alloy castings). Materials with large solidification shrinkage are more likely to experience large stresses in the near-weld region, potentially causing cracking.

In view of the above, the apparatus 10 is capable of processing a wide variety of materials, including but not limited to the following discussed below.

Aluminum and its alloys: Some aluminum alloys are considered weldable (5000 series) and typically have lower strength than those that are considered unweldable (6000 and 7000 series). The present invention provides for a substantial benefit in pulsing for those considered unweldable. The powder material 60 may be pure aluminum or an aluminum alloy. The powder material 60 also may be a mixture of particles of pure aluminum and one or more aluminum alloys or may be a mixture of various aluminum alloys. There are no restrictions on the composition of an aluminum powder material 60 other than it is to contain sufficient aluminum in metallic form for the powder material particles to form a substantially enveloping film of alumina.

Nickel and nickel alloys including nickel-based superalloys: Weldability is a critical factor. Nickel based alloys that have a high aluminum or titanium concentration are typically considered unweldable. The use of a pulsed laser beam 42 is believed to be capable of reducing the crack level in these difficult to weld materials.

Titanium and its alloys: Although most titanium alloys are considered weldable and relatively easily processed by laser sintering processes, large scale cracking may be observed. In the present invention, the pulsed laser beam 42 is believed to be capable of reducing the magnitude of residual stresses and provide benefit in terms of reduced cracking.

Intermetallics: Intermetallic titanium aluminide (TiAl) exhibits low ductility at room temperature and is prone to significant macro and microcracking.

Refractory materials: In the present invention, a pulsed laser beam 42 is believed to be capable of reducing the magnitude of residual stresses and cracking of refractory materials, which tend to crack during resolidification. Refractory metals such as tungsten and molybdenum have fairly high ductile to brittle transition temperatures and are fairly difficult to produce. In the present invention, the pulsed laser beam 42 is also believed to be capable of reducing the magnitude of residual stresses and cracking of refractory metals such as niobium and tantalum alloys. In one embodiment, the powder material 60 comprises elemental metals selected from the group of refractory metals, metals commonly used for gettering, alkaline earth metals, and group IV metals, as well as compounds and alloys of the same. Examples of refractory metals include, but are not limited to Mo, W, Ta, Rh, and Nb. Getter materials are those that readily collect free gases by adsorption, absorption, and/or occlusion and commonly include Al, Mg, Th, Ti, U, Ba, Ta, Nb, Zr, and P, though several others also exist. Finally, the group 4 metals include Ti, Zr, and Hf. Examples of metal compounds include metal hydrides, for example, $TiH_2$, and intermetallics, for example, TiAl and $TiAl_3$. A specific instance of an alloy includes Ti-6Al4V, among others.

Copper and its alloys: In the present invention, a pulsed laser beam 42 is believed to be capable of reducing the magnitude of residual stresses and cracking in copper and related, high thermal conductivity, low optical absorption alloys.

Metallic glasses: In another embodiment of the present invention, an amorphous metal is used (also known metallic glass or glassy metal), which is a solid metallic material, usually an alloy, with a disordered atomic-scale structure. Most metals are crystalline in their solid state, which means they have a highly ordered arrangement of atoms. Amorphous metals are non-crystalline, and thus are glasses, but unlike conventional glasses that are electrical insulators, amorphous metals have good electrical conductivity. There are several ways in which amorphous metals can be produced, including extremely rapid cooling, physical vapor deposition, solid-state reaction, ion irradiation, and mechanical alloying. In the present invention, an increase in cooling rate produces smaller (better) precipitates. In one embodiment, the present methods are used with a current pulse frequency of around 20 kHz with a duty cycle of 0.5, and the material goes from liquid to solid in the off period with a maximum temperature of 1200 degrees C., producing a cooling rate of about $2.4 \times 10^7$ Kelvin/second, which is an order of magnitude cooling rate increase over previously used six-Sigma measured cooling rates of $1.5 \times 10^6$ K/s.

With metallic glasses, rapid solidification produces metastable strengthened states, which are different in different alloys (there are rapidly solidified steels, aluminums, and others) If cooled from melted material slowly, the particles of these phases grow excessively, reducing their effectiveness as strengtheners. In the case of aluminum materials with scandium (Scalmalloy, Pandalloy), by cooling rapidly, the scandium in solution does not have time to form large particles. While it is known that laser sintering processes have an extremely rapid cooling rate (on the order of $10^6$ Kelvin/second), the present invention is suitable for materials that require rapid solidification. With pulsing, the method allows for an increase in cooling rate by allowing the temperature of the material to decrease to some extent between pulses.

In one embodiment, a metallic glass includes an alloy of at least two elements. The first element may include silver, aluminum, copper, nickel or a combination thereof. In another embodiment, the first element may include at least one selected from silver (Ag), copper gold (Au), aluminum (Al), calcium (Ca), beryllium (Be), magnesium (Mg), sodium (Na), molybdenum (Mo), tungsten (W), tin (Sn), zinc (Zn), nickel (Ni), potassium (K), lithium (Li), iron (Fe), palladium (Pd), platinum (Pt), rubidium (Rb), chromium (Cr), and strontium (Sr).

The second element may include at least one selected from lanthanum (La), cerium (Ce), praseodymium (Pr), promethium (Pm), samarium (Sm), lutetium (Lu), yttrium (Y), neodymium (Nd), gadolinium (Gd), terbium (Tb), dysprosium (Dy), holmium (Ho), erbium (Er), thulium (Tm), thorium (Th), calcium (Ca), scandium (Sc), barium (Ba), ytterbium (Yb), strontium (Sr), europium (Eu), zirconium (Zr), lithium (Li), hafnium (Hf), magnesium (Mg), phosphorus (P), arsenic (As), palladium (Pd), gold (Au), plutonium (Pu), gallium (Ga), germanium (Ge), aluminum (Al), zinc (Zn), antimony (Sb), silicon (Si), tin (Sn), titanium (Ti), cadmium (Cd), indium (In), platinum (Pt), rhodium (Rh), iridium (Ir), uranium (U), nickel (Ni), ruthenium (Ru), technetium (Tc), manganese (Mn), cobalt (Co), tantalum (Ta), niobium (Nb), osmium (Os), vanadium (V), iron (Fe), chromium (Cr), rhenium (Re), molybdenum (Mo), silver (Ag), tungsten (W), beryllium (Be), boron (B), copper (Cu), and mercury (Hg).

The first and/or second element may have a high oxidation potential, for example, copper, titanium, ruthenium, cadmium, zinc, rhodium, potassium, sodium, nickel, bismuth, tin, barium, germanium, lithium, strontium, magnesium, beryllium, lead, calcium, molybdenum, tungsten, cobalt, indium, silicon, gallium, iron, zirconium, chromium, boron, manganese, aluminum, lanthanum, neodymium, niobium, vanadium, yttrium, and/or scandium.

In another embodiment, the metallic glass may be included in an amount of about 30 to about 99 weight percent (wt %), about 0.1 to about 20 weight percent (wt %), and about 0.9 to about 69.9 weight percent (wt %), based on the total weight.

The metallic glass includes an alloy having a disordered atomic structure including two or more elements. The metallic glass may be an amorphous metal. The metallic glass may have about 50 to about 100 weight percent ("wt %"), specifically about 70 to about 100 wt %, more specifically about 90 to about 100 wt % amorphous content, based on a total weight of the metallic glass. In another embodiment, the metallic glass may be substantially amorphous.

If the metal powder material 60 includes aluminum (Al), the metallic glass may further include at least one selected from palladium (Pd), zirconium (Zr), platinum (Pt), thorium (Th), promethium (Pm), gadolinium (Gd), terbium (Tb), lutetium (Lu), hafnium (Hf), scandium (Sc), yttrium (Y), lanthanum (La), cerium (Ce), praseodymium (Pr), neodymium (Nd), samarium (Sm), dysprosium (Dy), holmium (Ho), erbium (Er), thulium (Tm), plutonium (Pu), rhodium (Rh), titanium (Ti), iridium (Ir), uranium (U), nickel (Ni), gold (Au), ruthenium (Ru), calcium (Ca), technetium (Tc), barium (Ba), ytterbium (Yb), manganese (Mn), cobalt (Co), europium (Eu), tantalum (Ta), strontium (Sr), niobium (Nb), osmium (Os), vanadium (V), phosphorus (P), iron (Fe), chromium (Cr), rhenium (Re), arsenic (As), molybdenum (Mo), lithium (Li), silver (Ag), magnesium (Mg), silicon (Si), germanium (Ge), tungsten (W), or copper (Cu).

If the metal powder material 60 includes copper (Cu) and zirconium (Zr), the metallic glass may further include at least one selected from aluminum (Al), silver (Ag), nickel (Ni), titanium (Ti), iron (Fe), palladium (Pd), and hafnium (Hf). At least one selected from aluminum (Al), silver (Ag), nickel (Ni), titanium (Ti), iron (Fe), palladium (Pd), and hafnium (Hf) may be included in an amount of about 10 atomic percent (at %) or less, based on the total amount of the metallic glass.

In another embodiment using metallic glasses, helium may be utilized since it is the most thermally conductive gas, about an order of magnitude higher than argon. While radiation is generally the most important cooling effect when a material is extremely hot, convection plays an important role. Therefore, to enhance the production of a rapidly solidified material, an atmosphere comprising substantially helium is utilized. In one embodiment, the production atmosphere comprises at least 30, 40, 50, 60, 70, 80, 90 percent or more helium. In another embodiment, the atmosphere comprises helium and argon. In another embodiment, a combination of a gas atmosphere and a reduced pressure is used. In this context, a reduced helium atmosphere is used alone or in combination with one or more additional gasses.

In another embodiment, the cooling rate is increased by thermally chilling or cooling the build platform or plate during production.

For iron-based metallic glasses, an iron-based glass-forming alloy may be used that includes, consists essentially of, or consists of about 45 to 70 atomic percent (at %) Fe, 10 to 30 at % Ni, 0 to 15 at % Co, 7 to 25 at % B, 0 to 6 at % C, and 0 to 2 at % Si. For example, the level of iron may be 45, 46, 47, 48, 49, 50, 51, 52, 53, 54, 55, 56, 57, 58, 59, 60, 61, 62, 63, 64, 65, 66, 67, 68, 69, and 70 atomic percent. The level of nickel may be 10, 11, 12, 13, 14, 15, 16, 17, 18, 19, 20, 21, 22, 23, 24, 25, 26, 27, 28, 29 and 30 atomic percent. The level of cobalt may be 0, 1, 2, 3, 4, 5, 6, 7, 8, 9, 10, 11, 12, 13, 14, and 15 atomic percent. The level of boron may be 7, 8, 9, 10, 11, 12, 13 14, 15, 16, 17, 18, 19, 20, 21, 22, 23, 24 and 25 atomic percent. The level of carbon may be 0, 1, 2, 3, 4, 5 and 6 atomic percent. The level of silicon may be 0, 1 and 2 atomic percent. The glass forming chemistries may exhibit critical cooling rates for metallic glass formation of less than 100,000 K/s, including all values and increments in the range of $10^3$ K/s to $10^5$ K/s. Critical cooling rate may be understood as a cooling rate that provides for formation of glassy fractions within the alloy composition. The iron based glass forming alloy may result in a structure that may consist primarily of metallic glass. That is at least 50% or more of the metallic structure, including all values and increments in the range of 50% to 99%, in 1.0% increments, may be glassy. Accordingly, it may be appreciated that little ordering on the near atomic scale may be present, i.e., any ordering that may occur may be less than 50 nm. In another example, the iron based alloy may exhibit a structure that includes, consists essentially of, or consists of metallic glass and crystalline phases wherein the crystalline phases may be less than 500 nm in size, including all values and increments of about 1 nm to about 500 nm in 1 nm increments.

In some examples, the alloys may include, consist essentially of, or consist of iron present in the range of 46 at % to 69 at %; nickel present in the range of 12 at % to 27 at %; optionally cobalt, which if present, may be present in the range of 2 at % to 15 at %; boron present in the range of 12 at % to 16 at %; optionally carbon, which if present, may be present in the range of 4 at % to 5 at %; optionally silicon, which if present, may be present in the range of 0.4 at % to 0.5 at %. It may be appreciated that the alloys may include the above alloying elements at 100 at % and impurities may be present in a range of 0.1 at % to 5.0 at %, including all values and increments therein. Impurities may be introduced by, among other mechanisms, feedstock compositions, processing equipment, reactivity with the environment during processing, etc.

The alloys may be produced by melting one or more feedstock compositions, which may include individual elements or elemental combinations. The feedstocks may be provided as powder materials or in other forms as well. The feedstocks may be melted by radio frequency (rf) induction, electric arc furnaces, plasma arc furnaces, or other furnaces or apparatus using a shielding gas, for example, an argon or helium gas. Once the feedstocks have been melted, they may be formed into ingots shielded in an inert gas environment. The ingots may be flipped and remelted to increase and/or improve homogeneity. The alloys may then be meltspun into ribbons having widths up to about 1.25 mm. Melt spinning may be performed at, for example, tangential velocities in the range of 5 to 25 meter per second, including all values and increments therein. A ribbon may have a thickness in the range of 0.02 mm to 0.15 mm, including all values and increments therein. Other processes may be used as well, for example, twin roll casting or other relatively rapid cooling processes capable of cooling the alloys at a rate of 100,000 K/s or less.

The above alloys may exhibit a density in the range of 7.70 grams per cubic centimeter to 7.89 grams per cubic centimeter, +/−0.01 grams per cubic centimeter, including all values and increments therein. In addition, the alloys may exhibit one or more glass to crystalline transition temperatures in the range of 410° C. to 500° C., including all values and increments therein, measured using DSC (Differential Scanning calorimetry) at a rate of 10° C. per minute. Glass to crystalline transition temperature may be understood as a temperature in which crystal structures begin formation and growth out of the glassy alloy. The primary onset glass to crystalline transition temperature may be in the range of 415° C. to 474° C. and the secondary onset glass to crystalline transition temperature may be in the range of 450° C. to 488° C., including all values and increments therein, again measured by DSC at a rate of 10° C. per minute. The primary peak glass to crystalline transition temperature may be in the range of 425° C. to 479° C. and the secondary peak glass to crystalline transition temperature may be in the range of 454° C. to 494° C., including all values and increment therein, again measured by DSC at a rate of 10° C. per minute. Furthermore, the enthalpy of transformation may be in the range of −40.6 J/g to −210 J/g, including all values and increments therein. DSC may be performed under an inert gas to prevent oxidation of the samples, for example, high purity argon gas.

Furthermore, the above alloys may exhibit initial melting temperatures in the range of 1060° C. to 1120° C. Melting temperature may be understood as the temperature at which the state of the alloy changes from solid to liquid. The alloys may exhibit a primary onset melting temperature in the range of 1062° C. to 1093° C. and a secondary onset melting temperature in the range of 1073° C. to 1105° C., including all values and increments therein.

In a further embodiment, iron-based glass-forming alloys may result in a structure that exhibits a Young's Modulus in the range of 119 to 134 GPa, including all values and increments therein. Young's Modulus may be understood as the ratio of unit stress to unit strain within the proportional limit of a material in tension or compression. The alloys may also exhibit ultimate or failure strength in the range of greater than 1 GPa, for example, in the range of 1 GPa to 5 GPa, for example, 2.7 GPa to 4.20 GPa, including all values and increments therein. Failure strength may be understood as the maximum stress value. The alloys may exhibit an elastic strain 0.5% or greater, including all values and increments in the range of 0.5 to 4.0%.

EXAMPLES. USE OF A PULSED LASER BEAM AND POWDER BED LASER MELTING APPARATUS

Example 1. Nonpulsed Aluminum Sample

A constant wave (CW) laser beam system was used with a powder bed laser melting apparatus in a method for the formation and consolidation of a 6061 aluminum alloy powder material.

An EOSINT M270 laser sintering (DMLS) machine (EOS GmbH, Munich, Del.), equipped with a continuous wave (CW) laser beam system was used to selectively and rapidly melt and solidify a quantity of the aluminum alloy powder material arranged in what is commonly referred to as powder bed.

The laser power level was set at 165 W, set to produce equal power as measured in the pulsed laser of Example 2 (below). The scan velocity (hatch speed) was set to 500 mm/s. The hatch spacing was set at 0.08 mm.

Figure 2:
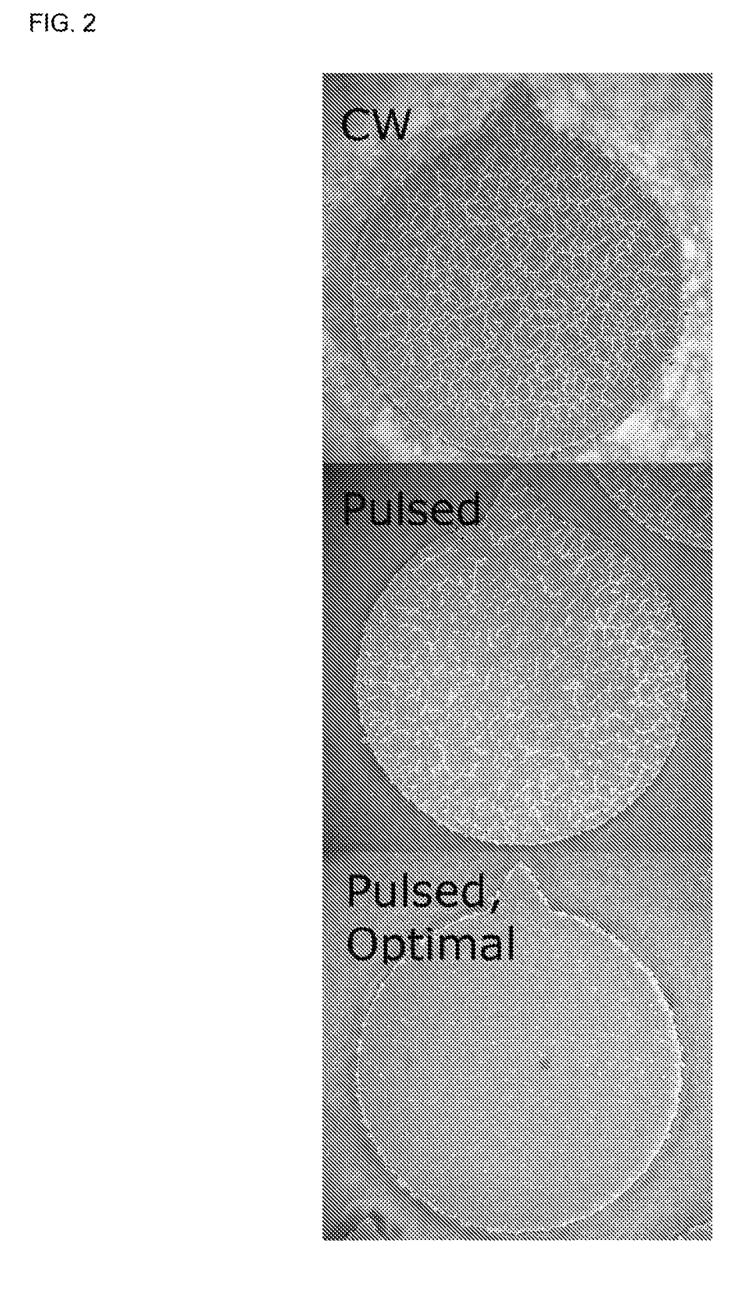
FIG. 2 shows photomicrographs of cross-sections of objects produced using constant wave technology (top) and pulsed wave technology (center and bottom).

The results of this procedure are represented in the top image of FIG. 2, from which it can be seen that the final product contained a significant and, for purposes of the invention, an unacceptable amount of microcracking.

Example 2. Pulsed Aluminum Sample #1

The original laser source was used in Example 1 was removed and replaced with a 400 Watt, GSI JK400FL ytterbium fiber laser (GSI Group, Bedford Mass.).

The fiber laser was operated to generate a pulsed wave laser beam to selectively and rapidly fuse a quantity of the aluminum alloy powder material arranged in a powder bed.

The laser peak power ($P_O$) was set at 400 W. The scan velocity was set to 500 mm/s. The hatch spacing was set at 0.08 mm. The duty cycle (D) was 0.51 and the average power ($P_{avg}$) was about 204 W based on a pulse frequency of 30 kHz and a pulse width of 17 μs. The global energy density was about 5.1 J/mm$^2$. The results of this procedure are represented in the middle image of FIG. 2, from which it can be seen that the final product contained significantly less microcracking than Example 1, but in some embodiments of the invention the level of microcracking was still considered to be excessive.

Example 3. Pulsed Aluminum Sample #2

The fiber laser used in Example 2 was operated to generate a pulsed wave laser beam to selectively and rapidly fuse a quantity of the aluminum alloy powder material arranged in a powder bed.

The laser peak power ($P_O$) was set at 500 W. The scan velocity was set to 100 mm/s. The hatch spacing was set at 0.06 mm. The duty cycle (D) was 0.5625 and the average power ($P_{avg}$) was about 281 W based on a pulse frequency of 22.5 kHz and a pulse width of 25 μs. The global energy density was about 47 J/mm$^2$. The results of this procedure are represented in the bottom image of FIG. 2, from which it can be seen that the final product was substantially free of microcracking, in accordance with an aspect of the invention. Though the bottom image in FIG. 2 is labeled as "optimal," such a description is solely for the purpose of identifying the particular sample within this nonlimiting experiment.

Based on this investigation, it was concluded that a particularly suitable global energy density for forming an object by pulsed-laser melting an Al6061 powder material and other aluminum alloys may be about 20 to about 60 J/mm$^2$. Furthermore, it was concluded that a particularly suitable range for the average power ($P_{avg}$) is about 280 to 350 W, a particularly suitable range for the duty cycle (D) is about 0.5 to 0.7, a particularly suitable range for the scan velocity (v) is about 100 to 200 mm/s, and a particularly suitable hatch spacing (s) is about 0.06 mm. Such a duty cycle range can be achieved with, for example, the pulsed laser beam having a pulse width in a range of about 25 to 35 microseconds and a pulse frequency of about 22.5 kHz.

Also on the basis of this investigation, it was concluded that particularly suitable global energy densities for forming objects by pulsed-laser melting powder materials other than aluminum-based powder materials would differ from those disclosed above. For example, it would be expected that the ranges for global energy density and duty cycle for materials other than aluminum-based powder materials would be higher or lower than those for aluminum and its alloys, depending on factors such as melting point. For certain powder materials, it is believed that the global energy density may be in a range of 0.1-50 J/mm², for example, in a range of 0.2-25 J/mm², or in a range of 0.3-15 J/mm², or in a range of 0.3-8 J/mm². On the other hand, higher global energy densities may be particularly suitable for powders formed of materials having higher melting points than aluminum and its alloys.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. For example, as an alternative to using laser radiation as electromagnetic radiation, a particle radiation, such as for example, electron radiation, may be used. Furthermore, instead of a single laser apparatus, two or more laser sources may be used. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill aspects stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An additive manufacturing apparatus, comprising:
   a pulsed-laser generating system; and
   a controller implemented within the additive manufacturing apparatus that sends control signals to control the additive manufacturing apparatus, wherein the control signals comprise:
   apply a pulsed laser energy to a first quantity of a powder material on a substrate so as to fuse particles of the powder material into a first layer on the substrate;
   form at least one additional layer on the first layer by applying a pulsed laser energy to at least a second quantity of the powder material on the first layer so as to fuse particles of the powder material into the at least one additional layer on the first layer; and
   apply the pulsed laser energy in a controlled manner such that solidification dynamics of the first and second quantities of the powder material are altered to promote at least one microstructural characteristic of the object comprising the first layer and the at least one additional layer; and,
   wherein the pulsed-laser generating system is limited by the controller to a global energy density to be between about 20 to about 60 J/mm2 and a pulse frequency to vary between about 20 KHz to about 50 KHz.

2. The additive manufacturing apparatus of claim 1, wherein the controlled manner of applying the pulsed laser energy causes the first and second quantities of the powder material to fully melt.

3. The additive manufacturing apparatus of claim 1, wherein the controlled manner of applying the pulsed laser energy reduces at least one microstructural defect in the first layer and the at least one additional layer, and the at least one microstructural defect is chosen from the group consisting of microcracks and porosity.

4. The additive manufacturing apparatus of claim 1, wherein the powder material is a metallic powder material.

5. The additive manufacturing apparatus of claim 4, wherein the metallic powder material is a metal material prone to microcracking resulting from rapid solidification and localized heating.

6. The additive manufacturing apparatus of claim 1, wherein the controlled manner of applying the pulsed laser energy causes the pulsed laser energy to have a global energy density that causes the object to be free of microcracks and porosity, wherein the global energy density is calculated with the equation:

$$\text{Global Energy Density} = P_{avg}/vs,$$

where $P_{avg}$ is laser peak power multiplied by duty cycle, v is scan velocity, and s is hatch spacing.

* * * * *